(12) United States Patent
Kim et al.

(10) Patent No.: US 11,728,515 B2
(45) Date of Patent: Aug. 15, 2023

(54) ELECTROLYTE FOR LITHIUM SECONDARY BATTERY AND LITHIUM SECONDARY BATTERY INCLUDING THE SAME

(71) Applicant: SK ON CO., LTD., Seoul (KR)

(72) Inventors: Sung Jin Kim, Daejeon (KR); Dai In Park, Daejeon (KR); Myoung Lae Kim, Daejeon (KR); Joo Hyun Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 143 days.

(21) Appl. No.: 17/186,152

(22) Filed: Feb. 26, 2021

(65) Prior Publication Data

US 2021/0273261 A1    Sep. 2, 2021

(30) Foreign Application Priority Data

Feb. 28, 2020 (KR) ........................ 10-2020-0025398

(51) Int. Cl.
| | |
|---|---|
| H01M 10/0567 | (2010.01) |
| H01M 10/0525 | (2010.01) |
| H01M 10/0568 | (2010.01) |
| H01M 10/0569 | (2010.01) |

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0028* (2013.01)

(58) Field of Classification Search
None
See application file for complete search history.

(56) References Cited

U.S. PATENT DOCUMENTS

| | | |
|---|---|---|
| 7,851,092 B2 | 12/2010 | Amine et al. |
| 8,993,177 B2 | 3/2015 | Amiruddin et al. |
| 9,227,950 B2 | 1/2016 | Mio et al. |
| 2016/0190643 A1 | 6/2016 | Kim et al. |
| 2018/0226685 A1 | 8/2018 | Ju et al. |
| 2019/0334197 A1 | 10/2019 | Burkhardt et al. |

FOREIGN PATENT DOCUMENTS

| | | |
|---|---|---|
| CN | 104466247 A | 3/2015 |
| CN | 110021785 A | 7/2019 |
| EP | 2631981 A1 | 8/2013 |
| JP | 6484225 B2 | 3/2019 |
| KR | 1020080012832 A | 2/2008 |
| KR | 1020120101499 A | 9/2012 |
| KR | 1020190047004 A | 5/2019 |

OTHER PUBLICATIONS

Machine Translation of Chinese Patent Publication No. 110021785 (Year: 2019).*

* cited by examiner

*Primary Examiner* — Wyatt P McConnell
(74) *Attorney, Agent, or Firm* — The Webb Law Firm

(57) ABSTRACT

An electrolyte for a lithium secondary battery according to embodiments of the present invention includes an organic solvent, a lithium salt, and an additive including a cyclic ether-sulfate-based compound. Thereby, cycle characteristics and high-temperature stability of the lithium secondary battery may be improved.

9 Claims, 2 Drawing Sheets

[FIG. 1]
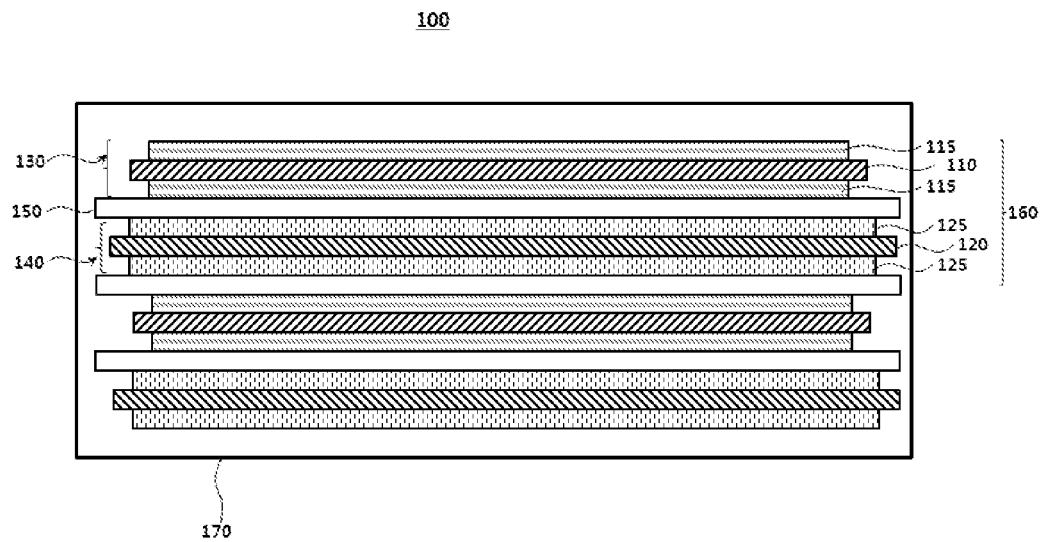
[FIG. 2]
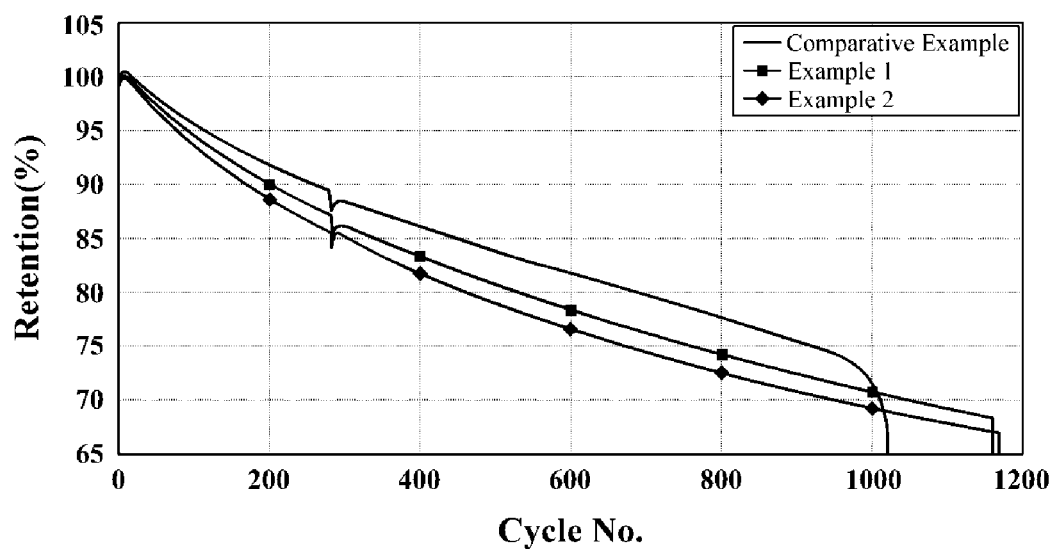

[FIG. 3]
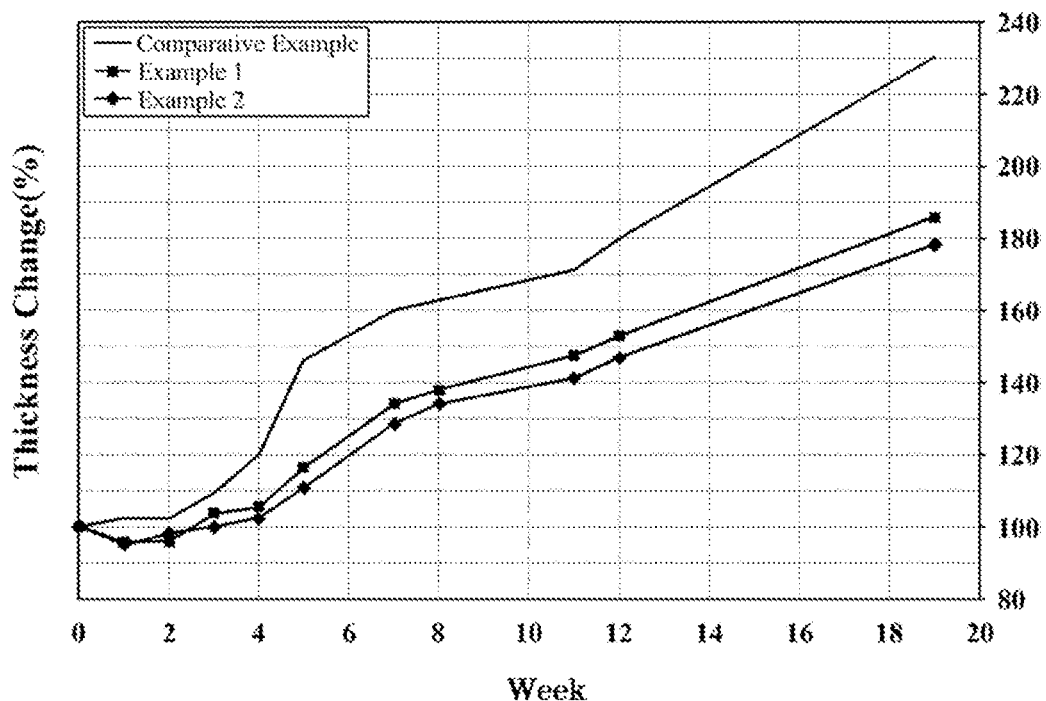

ELECTROLYTE FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2020-0025398 filed Feb. 28, 2020, the disclosure of which is hereby incorporated by reference in its entirety.

BACKGROUND OF THE INVENTION

1. Field of the Invention

The present invention relates to an electrolyte for a lithium secondary battery and a lithium secondary battery including the same, and more specifically, to an electrolyte for a lithium secondary battery, which includes an organic solvent, and a lithium secondary battery including the same.

2. Description of the Related Art

A secondary battery is a battery which can be repeatedly charged and discharged. With rapid progress of information and communication, and display industries, the secondary battery has been widely applied to various portable telecommunication electronic devices such as a camcorder, a mobile phone, a notebook computer as a power source thereof. Recently, a battery pack including the secondary battery has also been developed and applied to an eco-friendly automobile such as a hybrid vehicle as a power source thereof.

Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight. In this regard, the lithium secondary battery has been actively developed and applied as a power source.

For example, the lithium secondary battery may include: an electrode assembly including a cathode, an anode, and a separator; and an electrolyte in which the electrode assembly is impregnated. The lithium secondary battery may further include, for example, a pouch-shaped outer case in which the electrode assembly and the electrolyte are housed.

Meanwhile, the electrolyte may include a lithium salt such as LiPF$_6$. The lithium salt may react with moisture to form hydrogen fluoride (HF). Due to the hydrogen fluoride, cycle characteristics and high-temperature storage characteristics of the battery may be deteriorated.

For example, Korean Patent Laid-Open Publication No. 10-2012-0101499 discloses an electrolyte for a lithium secondary battery, but development of an electrolyte for improving the capacity characteristics of the battery is consistently required.

PRIOR ART DOCUMENT

Patent Document

Korean Patent Laid-Open Publication No. 10-2012-0101499

SUMMARY OF THE INVENTION

It is an object of the present invention to provide an electrolyte which allows a lithium secondary battery to be reliably operated with excellent chemical stability.

Another object of the present invention is to provide a lithium secondary battery including the electrolyte such that the battery may be reliably operated with excellent chemical stability.

To achieve the above objects, according to an aspect of the present invention, there is provided an electrolyte for a lithium secondary battery including: an organic solvent; a lithium salt; and an additive including a cyclic ether-sulfate-based compound.

In exemplary embodiments, the cyclic ether-sulfate-based compound may include a cyclic sulfate-based compound containing an ether group in a ring.

In exemplary embodiments, the cyclic ether-sulfate-based compound may be represented by Formula 1 below:

[Formula 1]

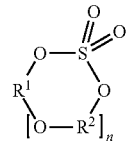

(In Formula 1, R$^1$ and R$^2$ are each independently an alkanediyl group having 1 to 4 carbon atoms, and n is an integer of 1 to 8.)

In exemplary embodiments, the cyclic ether-sulfate-based compound may include an ethyleneoxy group.

In exemplary embodiments, the cyclic ether-sulfate-based compound may include three or more ether groups.

In exemplary embodiments, the cyclic ether-sulfate-based compound may be included in an amount of 0.1 to 15% by weight based on a total weight of the electrolyte.

In exemplary embodiments, the additive may further include a cyclic sulfonate-based compound.

In exemplary embodiments, the organic solvent may include at least one of ethylene carbonate (EC), ethyl methyl carbonate (EMC), dimethyl carbonate (DMC), or diethyl carbonate (DEC).

According to another aspect of the present invention, there is provided a lithium secondary battery including: a cathode; an anode; a seperator interposed between the cathode and the anode; and the electrolyte for a lithium secondary battery according to the present invention. According to exemplary embodiments of the present invention, a cyclic ether-sulfate-based compound may be used as an additive of the electrolyte for a lithium secondary battery. The cyclic ether-sulfate-based (CES) compound may also form a solid-electrolyte interphase (SEI) having excellent stability on a surface of the electrode, thereby suppressing side reactions of the electrolyte with the active material. Accordingly, it is possible to improve life-span, capacity retention rate, and high-temperature stability of the secondary battery, and suppress a generation of gas and an increase in internal resistance during repeated use and exposure to high temperature.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic cross-sectional view illustrating a lithium secondary battery according to exemplary embodiments;

FIG. 2 is a graph illustrating cycle-capacity retention rates for a secondary battery including electrolytes of examples and comparative example; and FIG. 3 is a graph illustrating of high temperature storage period-thickness change rates of an anode for the secondary battery including the electrolytes of examples and comparative example.

DESCRIPTION OF THE INVENTION

Embodiments of the present invention provide an electrolyte for a lithium secondary battery including an organic solvent, a lithium salt, and a cyclic ether-sulfate-based additive, and a lithium secondary battery including the electrolyte. Thereby, cycle characteristics and high-temperature stability of the lithium secondary battery may be improved.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

<Electrolyte for a Lithium Secondary Battery>

An electrolyte for a lithium secondary battery (hereinafter, may be abbreviated as an electrolyte) according to embodiments of the present invention may include an organic solvent, a lithium salt and an additive which are mixed or dissolved in the organic solvent.

The organic solvent may include an organic compound which provides sufficient solubility to the lithium salt and the additive, and does not have reactivity in the lithium secondary battery. In exemplary embodiments, the organic solvent may include a carbonate-based solvent, an ester-based solvent, an ether-based solvent, a ketone-based solvent, an alcohol-based solvent, a nonprotonic solvent and the like. These solvents may be used alone or in combination of two or more thereof.

Examples of the carbonate-based solvent may include dimethyl carbonate (DMC), ethyl methyl carbonate (EMC), methyl propyl carbonate, ethyl propyl carbonate, diethyl carbonate (DEC), dipropyl carbonate, propylene carbonate (PC), ethylene carbonate (EC), fluoroethylene carbonate (FEC), butylene carbonate and the like.

Examples of the ester-based solvent may include methyl acetate (MA), ethyl acetate (EA), n-propyl acetate (n-PA), 1,1-dimethylethyl acetate (DMEA), methyl propionate (MP), ethyl propionate (EP), γ-butyrolacton (GBL), decanolide, valerolactone, mevalonolactone, caprolactone and the like.

Examples of the ether-based organic solvent may include dibutyl ether, tetraethylene glycol dimethyl ether (TEGDME), diethylene glycol dimethyl ether (DEGDME), dimethoxy ethane, 2-methyltetrahydrofuran, tetrahydrofuran and the like.

Examples of the ketone-based solvent may include cyclohexanone and the like. Examples of the alcohol solvent may include ethyl alcohol, isopropyl alcohol and the like.

Examples of the nonprotonic solvent may include a nitrile solvent, an amide solvent such as dimethyl formamide (DMF), etc., a dioxolane solvent such as 1,3-dioxolane, etc., a sulfolane solvent and the like.

In a preferred embodiment, the carbonate-based solvent may be used as the organic solvent. For example, the organic solvent may include ethylene carbonate (EC), ethyl methyl carbonate (EMC), dimethyl carbonate (DMC), diethyl carbonate (DEC), or a combination thereof.

The lithium salt may include, for example, a compound represented by $Li^+X^-$.

Non-limiting examples of an anion (X—) of the lithium salt may include $F^-$, $Cl^-$, $Br^-$, $I^-$, $NO_3^-$, $N(CN)_2^-$, $BF_4^-$, $ClO_4^-$, $PF_6^-$, $SbF_6^-$, $asF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_2)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, $PO_2F_2^-$ and the like. The anion may be used alone or in combination of two or more thereof. Preferably, the lithium salt includes lithium hexafluorophosphate ($LiPF_6$).

In one embodiment, the lithium salt may be included in a concentration of about 0.1 to 5 M, and preferably about 0.5 to 2 M based on the organic solvent. Lithium ions and/or electrons may smoothly move within the above range.

The additive may include a cyclic ether-sulfate-based compound. The cyclic ether-sulfate-based compound may refer to a cyclic compound including an ether group (—O—) and a sulfate group.

The cyclic ether-sulfate-based compound may further include an amine group (—NH— or —NR—), an ester group (—COO—), an amide group (—CONR—), a ketone group (—CO—), a carbonate group (—OCOO—) and the like.

In exemplary embodiments, the cyclic ether-sulfate-based compound may include a hydrocarbon chain in a ring. The hydrocarbon chain may include a single bond, a double bond or a triple bond. In some embodiments, carbon in the hydrocarbon chain may be substituted with a hydroxy group, an amine group, a thiol group, a halogen group or the like.

The cyclic ether-sulfate-based compound may include a compound in which an ether group is included in a ring of a cyclic sulfate-based compound.

In exemplary embodiments, the cyclic ether-sulfate-based compound may include a compound in which a sulfate group is used to substitute in a ring of a cyclic ether compound (e.g., crown ether).

In exemplary embodiments, the cyclic ether-sulfate-based compound may be represented by Formula 1 below.

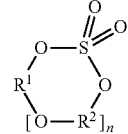

[Formula 1]

In Formula 1, $R^1$ and $R^2$ are each independently an alkanediyl group having 1 to 4 carbon atoms, and n may be an integer of 1 to 8. Preferably, n is an integer of 2 to 6.

For example, $R^1$ and $R^2$ may include a methylene group (—$CH_2$—), an ethylene group (—$CH_2CH_2$—), a propylene group (—$C_3H_6$—) or a butylene group (—$C_4H_8$—), and may have a branched or straight chained form. Preferably, $R^1$ and $R^2$ are an ethylene group, respectively.

Preferably, $R^1$ and $R^2$ may be the same as each other. In this case, molecular structures thereof may have symmetry, and two oxygen bonding groups included in the sulfate group may have uniform reactivity. Accordingly, formation of SEI film of the cyclic ether-sulfate-based compound may be accelerated.

In exemplary embodiments, the cyclic ether-sulfate-based compound may include an ethyleneoxy group (—CH$_2$CH$_2$O—). The cyclic ether-sulfate-based compound may include three or more ether groups. In this case, life-span and high-temperature storage characteristics of the battery may be improved.

In exemplary embodiments, the cyclic ether-sulfate-based compound may be included in an amount of 0.1 to 15% by weight ('wt. %') based on a total weight of the electrolyte. If the content of the cyclic ether-sulfate-based compound is less than 0.1 wt. %, cycle characteristics and high-temperature storage characteristics of the battery may not be improved. If the content of the cyclic ether-sulfate-based compound exceeds 15 wt. %, an internal resistance of the lithium secondary battery may be excessively increased.

Preferably, the cyclic ether-sulfate-based compound is included in an amount of 0.5 to 10 wt. %, and more preferably, 0.5 to 5 wt. % based on the total weight of the electrolyte.

For example, metal (e.g., transition metal) may be eluted from a cathode of the lithium secondary battery according to the use thereof. The eluted metal may be electrodeposited on the anode, thereby causing a deterioration in performance of the anode. In addition, when driving the lithium secondary battery at a high voltage, a film on the surface of the cathode may be decomposed to cause side reactions between the surface of the cathode and the electrolyte.

The cyclic ether-sulfate-based compound contains oxygen and sulfur together, and oxygen bond and sulfur bond may be formed upon decomposition of the cyclic ether-sulfate-based compound. The oxygen bond and/or the sulfur bond may be combined with the electrode surface to form a stable SEI film. In this case, stability of the electrode surface structure may be increased and side reactions between the electrode and the electrolyte may be suppressed. Accordingly, generation of gas may be suppressed during repeated charging/discharging or exposure to high temperature, and swelling and increase in the resistance of the battery may be suppressed.

The cyclic ether-sulfate-based compound may accelerate formation of the SEI film having a stable structure to prevent side reactions of the electrolyte with the electrode. In this case, reduction of lithium ions and decomposition of the electrolyte and the active material may be suppressed. Therefore, cycle characteristics and high-temperature stability of the secondary battery may be improved.

According to exemplary embodiments, the additive may stabilize the cathode structure. In this case, when using and storing the lithium secondary battery at a high temperature, the elution of metal, generation of gas, and expansion of volume (thickness) may be suppressed. Accordingly, the life-span and high-temperature storage characteristics of the lithium secondary battery may be improved. In addition, an increase in the resistance of the battery may be suppressed when driving at a high voltage.

In exemplary embodiments, the electrolyte may include an additional additive such as a cyclic carbonate-based compound including a double bond, a fluorine-substituted cyclic carbonate-based compound, a sultone-based compound, a cyclic sulfonate-based compound and the like.

The cyclic carbonate-based compound including the double bond may include vinylene carbonate, vinyl ethylene carbonate and the like.

The fluorine-substituted cyclic carbonate-based compound may include fluoroethylene carbonate.

The cyclic carbonate-based compound including the double bond and the fluorine-substituted cyclic carbonate-based compound may improve thermal and electrical durability of a film formed on the electrode surface.

For example, each of the cyclic carbonate-based compound including the double bond and the fluorine-substituted cyclic carbonate-based compound may be included in an amount of 0.1 to 5 wt. % based on the total weight of the electrolyte. If the content thereof is less than 0.1 wt. %, the durability of the film may be reduced, and if the content thereof exceeds 5 wt. %, a thickness of the film may be excessively increased. In this case, the resistance of the battery may be increased and the output may be decreased.

The sultone-based compound may include 1,3-propane sultone, 1,3-propene sultone, 1,4-butane sultone and the like.

The cyclic sulfonate-based compound may include 1,2-ethylene sulfate, 1,2-propylene sulfate and the like.

The sultone-based compound and the cyclic sulfonate-based compound may form a more stable ion conductive film on the electrode surface.

For example, each of the sultone-based compound and the cyclic-based sulfonate compound may be included in an amount of 0.1 to 5 wt. % based on the total weight of the electrolyte. If the content thereof is less than 0.1 wt. %, the durability of the film may be reduced, and if the content thereof exceeds 5 wt. %, the thickness of the film may be excessively increased. In this case, the resistance of the battery may be increased and the output may be decreased.

In some embodiments, the electrolyte may be a non-aqueous electrolyte which does not contain water.

<Lithium Secondary Battery>

FIG. 1 is a schematic cross-sectional view illustrating a lithium secondary battery according to exemplary embodiments.

Referring to FIG. 1, a lithium secondary battery 100 may include an electrode assembly including a cathode 130, an anode 140, and a separator 150 interposed between the cathode and the anode. The electrode assembly may be housed together with the electrolyte according to the above-described exemplary embodiments in a case 170 to be impregnated.

The cathode 130 may include cathode active material layers 115 formed by applying a cathode active material to a cathode current collector 110. The cathode active material may include a compound capable of reversibly intercalating and deintercalating lithium ions.

In exemplary embodiments, the cathode active material may include a lithium transition metal oxide. For example, the lithium transition metal oxide includes nickel (Ni), and may further include at least one of cobalt (Co) and manganese (Mn).

For example, the lithium transition metal oxide may be represented by Formula 3 below.

$$Li_{1+\alpha}Ni_{1-(x+y)}Co_xM_yO_2 \qquad \text{[Formula 3]}$$

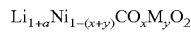

In Formula 3, α, x and y may be in a range of $-0.05 \leq \alpha \leq 0.15$, $0.01 \leq x \leq 0.3$, and $0.01 \leq y \leq 0.3$, and M may be at least one element selected from Mn, Mg, Sr, Ba, B, Al, Si, Ti, Zr and W.

A slurry may be prepared by mixing the cathode active material with a binder, a conductive material and/or a dispersant in a solvent, followed by stirring the same. The slurry may be coated on the cathode current collector 110, followed by drying and compressing to manufacture the cathode 130.

The cathode current collector 110 may include, for example, stainless steel, nickel, aluminum, titanium, copper, or an alloy thereof, and preferably includes aluminum or an aluminum alloy.

The binder may be selected from, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as a binder for a cathode. In this case, an amount of the binder for forming the cathode active material layer may be reduced and an amount of the cathode active material may be relatively increased, thereby improving the output and capacity of the secondary battery.

The conductive material may be included to facilitate electron transfer between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$.

The anode 140 may include an anode current collector 120 and anode active material layers 125 formed by coating the anode current collector 120 with an anode active material.

According to exemplary embodiments, a silicon (Si)-based compound may be used as the anode active material. In some embodiments, silicon-carbon particles including silicon carbide (SiC), or a carbon core and a silicon coating layer may be used as the anode active material.

The silicon-carbon particles may be formed by depositing a silicon layer on a surface of the graphite core, for example. In one embodiment, the silicon-carbon particles may be formed by coating a silicon layer on the commercially used graphite particles through a chemical vapor deposition (CVD) process using a silicon precursor compound such as a silane-based compound.

In some embodiments, the silicon-carbon particles may have a structure in which a plurality of carbon coating layers and silicon coating layers are alternately coated or laminated on the graphite core.

Conventionally, a carbon-based material has been mainly used as the anode active material, and in the case of the carbon-based material, a theoretical capacity may be limited to a level of about 370 mAh/g. According to exemplary embodiments, when using the silicon-based compound as the anode active material, it is possible to significantly improve the output and capacity characteristics of the secondary battery beyond the theoretical capacity limit of the carbon-based material.

The anode current collector 120 may include, for example, gold, stainless steel, nickel, aluminum, titanium, copper, or an alloy thereof, and preferably includes copper or a copper alloy.

In some embodiments, a slurry may be prepared by mixing the anode active material with a binder, a conductive material and/or a dispersant in a solvent, followed by stirring the same. The slurry may be coated on the anode current collector 120, followed by drying and compressing to manufacture the anode 140. As the conductive material, materials which are substantially the same as or similar to the above-described materials may be used.

In exemplary embodiments, styrene-butadiene rubber (SBR) capable of reacting with the above-described reactive additive of the electrolyte may be used as a binder for an anode. In some embodiments, a thickener such as carboxymethyl cellulose (CMC) may be used together with the SBR.

As described above, the silicon-based compound may be used as the anode active material to increase capacity and output characteristics of the battery. However, the silicone-based compound has a high volume expansion/contraction rate, such that the anode active material layers 125 or the anode active material particles may repeatedly expand and contract during repeated charging and discharging.

In this case, the anode active material particles may be decomposed or collapsed to be exposed in the electrolyte, and depletion of the electrolyte and an increase in the resistance may be caused by irreversible decomposition of the electrolyte.

However, according to exemplary embodiments, by combining SBR as the binder for an anode and the reactive additive included in the electrolyte, it is possible to suppress expansion of the anode active material including the silicon-based compound.

The separator 150 may be interposed between the cathode 130 and the anode 140. The separator 150 may include a porous polymer film made of a polyolefin polymer such as ethylene homopolymer, propylene homopolymer, ethylene/butene copolymer, ethylene/hexene copolymer, ethylene/methacrylate copolymer. The separator may include a non-woven fabric made of glass fiber having a high melting point, polyethylene terephthalate fiber or the like.

In some embodiments, the anode 140 may have an area and/or volume (e.g., a contact area with the separation membrane 150) larger than those/that of the cathode 130. Thereby, lithium ions generated from the cathode 130 may smoothly move to the anode 140 without being precipitated in the middle, for example.

According to exemplary embodiments, the electrode cell 160 is defined by the cathode 130, the anode 140, and the separation membrane 150, and a plurality of electrode cells 160 are stacked to form, for example, a jelly roll type electrode assembly. For example, the electrode assembly may be formed by winding, laminating, folding, or the like of the separation membrane.

The electrode assembly may be housed in the case 170 together with the electrolyte according to exemplary embodiments to define the lithium secondary battery 100.

Electrode tabs may be respectively formed from the cathode current collector 110 and the anode current collector 120 belonging to each electrode cell 160 and may extend to one side of the case 170. The electrode tabs may be fused together with the one side of the case 170 to form an electrode lead extending or exposed to an outside of the case 170.

The lithium secondary battery 100 may be manufactured, for example, in a cylindrical shape using a can, a square shape, a pouch shape or a coin shape.

Hereinafter, preferred examples are proposed to more concretely describe the present invention. However, the following examples are only given for illustrating the present invention and those skilled in the art will obviously understand that various alterations and modifications are possible within the scope and spirit of the present invention. Such alterations and modifications are duly included in the appended claims.

Comparative Example: Preparation of Reference Electrolyte Solution

A reference electrolyte solution was prepared by dissolving 1.0 M $LiPF_6$ solution in a mixed solvent of EC/EMC (25/75; volume ratio), and then adding 3 wt. % of fluoroethylene carbonate, 1 wt. % of LiPO$_2$F$_2$, 0.5 wt. % of propane sultone and 0.5 wt. % of prop-1-ene-1,3-sultone based on the total weight of the mixed solvent thereto.

Examples 1 and 2

Electrolytes of Examples 1 and 2 were prepared by adding 0.5 wt. % and 1 wt. % of a compound represented by Formula 2 below based on the total weight of the mixed solvent to the reference electrolyte solution prepared in the comparative example.

[Formula 2]

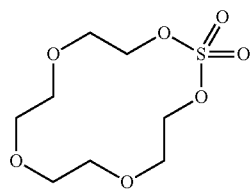

Preparative Example: Preparation of Secondary Battery

A slurry was prepared by mixing Li[Ni$_{0.6}$Co$_{0.2}$Mn$_{0.2}$]O$_2$ as a cathode active material, carbon black as a conductive material, and polyvinylidene fluoride (PVdF) as a binder in a weight ratio of 92:5:3. The prepared slurry was uniformly applied to an aluminum foil having a thickness of 15 μm, and is vacuum-dried at 130° C. to prepare a cathode for a lithium secondary battery.

An anode slurry, which include 95 wt. % of silicon graphite composite (SiC) containing silicon in an amount of 10 wt. % as an anode active material, 1 wt. % of Super-P as a conductive material, 2 wt. % of styrene-butadiene rubber (SBR) as a binder, and 2 wt. % of carboxymethyl cellulose (CMC) as a thickener, was prepared. The prepared anode slurry was uniformly applied to a copper foil having a thickness of 15 μm, followed by drying and pressing to prepare an anode.

The cathodes and the anodes prepared as described above were respectively cut into a predetermined size and laminated, then an electrode cell was fabricated between the cathode and the anode with a separator (polyethylene, thickness: 20 μm) interposed therebetween. Thereafter, tap parts of the cathode and the anode were welded, respectively. A combination of the welded cathode/separator/anode was put into a pouch, followed by sealing three sides of the pouch except for one side into which an electrolyte is injected. At this time, a portion having the electrode tab was included in the sealing part. After injecting the electrolytes prepared in the comparative example and examples through the remaining side except for the sealing part, and the remaining side was also sealed, followed by impregnation for 12 hours or more to manufacture a lithium secondary battery. The manufactured secondary battery had a capacity of about 2.3 Ah.

Experimental Example 1: Evaluation of Life-Span at Room Temperature

Discharge capacities were measured by repeatedly charging (CC/CV 1 C 4.2 V 0.1 C CUT-OFF) and discharging (CC 1 C 2.7 V CUT-OFF) the manufactured secondary battery at about 35° C., then capacity retention rates were calculated as a percentage after performing charging/discharging cycles multiple times compared to initial discharge capacity, and results thereof are shown as a graph in FIG. 2.

Referring to FIG. 2, in the case of the comparative example, it was confirmed that the capacity retention rate is rapidly decreased after about 1,000 times of charging and discharging, but in the case of the examples, it was confirmed that the capacity was maintained at an appropriate level even up to about 1,200 times of charging and discharging.

Experimental Example 2: Evaluation of High-Temperature Storage Characteristics

The manufactured secondary batteries were placed in a chamber at 60° C. for 4 and 6 weeks, and then left at room temperature for 30 minutes.

(1) Evaluation of Capacity Retention Rate

The left secondary batteries were charged (CC/CV 1 C 4.2 V 0.1 C CUT-OFF) and discharged (CC 1 C 2.7 V CUT-OFF), and the discharge capacities were measured, then capacity retention rates were calculated as a percentage compared to the initial discharge capacity at room temperature, and results thereof are shown in Table 1 below.

(2) Evaluation of Thickness Change of Anode

Thicknesses of the anode after storage at high temperature were measured, and thickness change rates were calculated as a percentage compared to the initial thickness of the anode, and results thereof are shown in Table 1 below.

TABLE 1

| | Storage for 4 weeks | | Storage for 6 weeks | |
|---|---|---|---|---|
| Section | Capacity retention rate (%) | Thickness change rate (%) | Capacity retention rate (%) | Thickness change rate (%) |
| Comparative example | 72 | 120 | 65 | 154 |
| Example 1 | 79 | 106 | 70 | 138 |
| Example 2 | 81 | 103 | 74 | 131 |

Referring to Table 1, it was confirmed that the capacity retention rates were improved and amounts of increase in thickness were decreased in the case of examples during high-temperature storage compared to the comparative example in which the cyclic ether-sulfate-based compound was not used.

DESCRIPTION OF REFERENCE NUMERALS

110: Cathode current collector
115: Cathode active material layer
120: Anode current collector
125: Anode active material layer
130: Cathode
140: Anode
150: Separator
160: Electrode cell
170: Case

What is claimed is:
1. An electrolyte for a lithium secondary battery comprising:
an organic solvent;
a lithium salt; and
an additive including a cyclic ether-sulfate-based compound, wherein the cyclic ether-sulfate-based compound includes an ether group and a sulfate group which form a single ring structure.

2. The electrolyte for a lithium secondary battery according to claim 1, wherein the cyclic ether-sulfate-based compound includes a cyclic sulfate-based compound containing an ether group in a ring.

3. The electrolyte for a lithium secondary battery according to claim 1, wherein the cyclic ether-sulfate-based compound is represented by Formula 1 below:

[Formula 1]

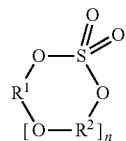

in Formula 1, $R^1$ and $R^2$ are each independently an alkanediyl group having 1 to 4 carbon atoms, and n is an integer of 1 to 8.

4. The electrolyte for a lithium secondary battery according to claim 1, wherein the cyclic ether-sulfate-based compound includes an ethyleneoxy group.

5. The electrolyte for a lithium secondary battery according to claim 1, wherein the cyclic ether-sulfate-based compound includes three or more ether groups.

6. The electrolyte for a lithium secondary battery according to claim 1, wherein the cyclic ether-sulfate-based compound is included in an amount of 0.1 to 15% by weight based on a total weight of the electrolyte.

7. The electrolyte for a lithium secondary battery according to claim 1, wherein the additive further includes a cyclic sulfonate-based compound.

8. The electrolyte for a lithium secondary battery according to claim 1, wherein the organic solvent includes at least one of ethylene carbonate (EC), ethyl methyl carbonate (EMC), dimethyl carbonate (DMC), or diethyl carbonate (DEC).

9. A lithium secondary battery comprising:

a cathode;

an anode;

a separator interposed between the cathode and the anode; and the electrolyte for a lithium secondary battery according to claim 1.

* * * * *